April 5, 1949.  G. H. HUFFERD ET AL  2,466,428

PISTON SEAL

Filed June 20, 1945

INVENTORS
GEORGE H. HUFFERD
& JOSEPH NORMAN PAQUIN
BY *Richey & Watts*

ATTORNEYS

UNITED STATES PATENT OFFICE 2,466,428

PISTON SEAL

George H. Hufferd, Shaker Heights, and Joseph Norman Paquin, Euclid, Ohio, assignors to The Weatherhead Company, Cleveland, Ohio, a corporation of Ohio Application June 20, 1945, Serial No. 600,608

5 Claims. (Cl. 309—43)

Our invention relates to fluid seals and concerns particularly arrangements for sealing pistons and piston rods in cylinders.

It is an object of our invention to provide an improved device and method for preventing leakage of fluid in a clearance space between two confronting surfaces.

A further object of our invention is to provide a long-life, leakproof joint requiring a minimum of lubrication.

Still another object of our invention is to provide improved sealing of clearance space between moving parts.

Still another object of the invention is to provide an improved hydraulic or pneumatic cylinder with leakage avoided around piston head and piston rod clearances.

A further object of the invention is to avoid extrusion of packing material and to avoid locking or wedging of movable parts such as pistons in the cylinder of an hydraulic or pneumatic operator.

Other and further objects, features and advantages of the invention will become apparent as the description proceeds.

In carrying out our invention in accordance with a preferred form thereof in connection with an hydraulic or pneumatic operating cylinder, we provide an annular groove in the shorter of the two relatively movable members, and we provide a ring pack of relatively hard flat slit washers or ring-shaped pieces in the groove, with a relatively soft resilient band filling the base of the groove for pressing the ring pack against the surface of the longer of the two relatively movable members. For sealing the piston head the groove is in the piston head and for sealing the piston rod the groove is in the cylinder head around the opening for the piston rod.

A better understanding of our invention will be afforded by the following detailed description considered in conjunction with the accompanying drawing and the scope of the invention will be set forth in the claims appended hereto.

In the drawing.

Like reference characters are utilized throughout the drawing to designate like parts.

Figure 1:
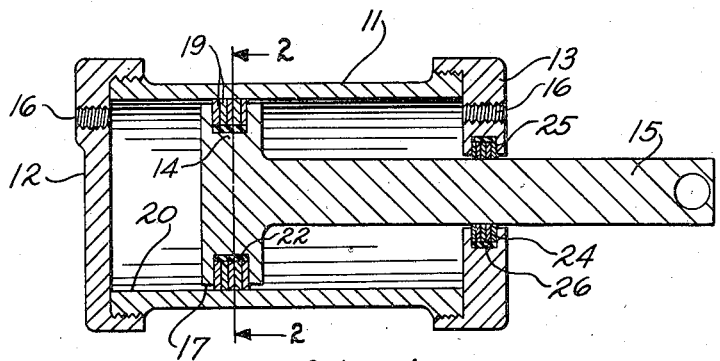
Fig. 1 is a longitudinal, medial sectional view of an embodiment of the invention.
Figure 2:
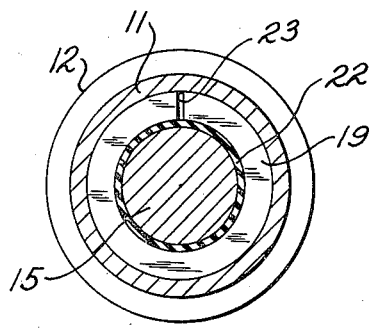
Fig. 2 is a cross-sectional view of the apparatus of Fig. 1 represented as cut by a plane 2—2.
Figure 3:
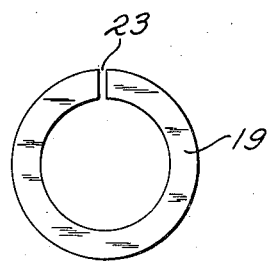
Fig. 3 is a plan view of one of the sealing rings employed in the arrangement of Figs. 1 and 2.

Our invention is not limited to the sealing of annular clearance spaces, nor is it limited to forming substantially fluid-tight joints in piston and cylinder constructions. Nevertheless for the sake of illustration, we have shown in the drawings a cylinder and piston of the type which may be employed as an hydraulic or pneumatic operator, for example.

The arrangement illustrated in Fig. 1 comprises a hollow cylinder 11 with end caps or cylinder heads 12 and 13 for closing the same and having a piston head 14 slidably mounted within the cylinder 11, carried by or integral with a piston rod 15 extending through the cylinder head 13. As illustrated, suitable threaded openings 16 are provided in the cylinder heads 12 and 13 for making fluid connections to the space within the cylinder 11 on either side of the piston head 14. A clearance space 17, which in the arrangement of Fig. 1 is annular in shape, is provided between the outer surface of the piston head 14 and the inner surface 20 of the cylinder 11. The clearance space 17 may be made as small as machining and assembling procedures conveniently permit, however in accordance with our invention it is unnecessary that the clearance space be small and it is unnecessary to make the clearance space 17 as small as has heretofore been attempted in a futile effort to prevent extrusion of soft seals or gaskets into the clearance space.

An annular groove 18 is formed in the piston head 14 which, axially measured, is the shorter of the two relatively movable members, including the piston head 14 and the cylinder 11. For forming a seal against the inner surface 20 of the cylinder 11, a ring-pack comprising a plurality of split rings 19 is mounted within the annular groove 18 of such normal diameter as to tend to fit closely against the inner surface of the cylinder 11. For pressing the ring-pack 19 against the cylinder surface 20, with the rings in edgewise engagement therewith and for forming a seal between the base 21 of the groove 18 and the inner edges of the packing means 19, an endless band comprising a single piece of relatively soft resilient material 22 is provided in the base of the annular groove 18 of such size as to fill the base of the groove. Preferably the rings 19 are composed of relatively hard material to avoid any possibility of extrusion through the clearance space 17.

The resilient band 22 is preferably composed of a material such as soft rubber or a rubber-like substance such as various synthetic compositions, preferably one which is oil resistant. The resilient flat rings 19 may be composed of any suitable material such as metal or a non-metallic substance such as hard rubber, formica, a phenolic condensation product, or other plastic material or the like. As shown in the drawings the flat resilient rings 19 are relatively thin in comparison with their width, or dimension measured in an axial direction. They thus have a high degree of resiliency and tend to contact closely the opposing cylindrical surface so as to make a good seal in response to expanding pressure from the band 22 as explained hereinafter.

The elasticity of the band 22 permits stretching it enough to slip it over the piston head and into the groove 18. To facilitate assembly of the rings 19 in the groove 18, preferably the rings 19 are each formed with a slit 23. In this manner they can be slipped over the piston head for installation. Preferably the slits 23 in successive rings 19 are at different angular positions so as to avoid interference with the sealing function of the rings 19.

The rod packing may be similar to that illustrated for the piston head 14. In this case the cylinder head 13 is the relatively short member, measured axially, and the piston rod 15 is the relatively long member, a ring-pack 24 is provided which is retained within the relatively short member 16, preferably within an annular groove 25. As in the case of the piston packing, an endless soft resilient band 26 is provided in the base of the annular slot 25 for pressing the edges of the rings 24 against the surface of the rod 15, in order to form a seal. The construction is wear resistant and requires relatively little lubrication.

Figure 4:
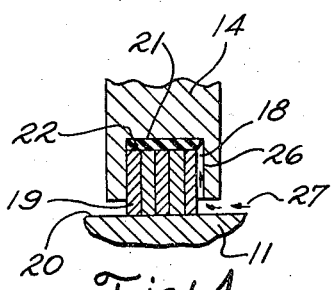
Fig. 4 is a fragmentary sectional view representing a portion of the apparatus of Fig. 1 with pressure acting.
Figure 5:
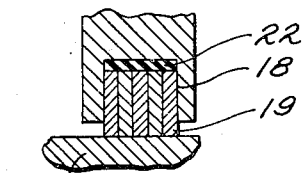
Fig. 5 is a corresponding view without pressure acting.

As illustrated in Figs. 1 and 5 the natural or unstressed normal dimensions of the packing rings 19 and the resilient band 22 are such that the rings 19 tend to fit closely against the inner wall of the cylinder 11 and the band 22 tends to fill the space in the base of the groove 18 under the inner edges of the ring 19. Furthermore, the rings 19 are of such number and thickness as to fill the axial dimension of the groove 18 so far as possible. But since the rings 19 must be inserted in the groove 18, their stack height will be somewhat less than the axial dimension of the groove 18. When the seal is under pressure, there is a tendency for fluid to press against the rings 19 axially so as to drive them away from one wall of the groove 18 and toward the other, and form a space between the ring pack and one wall 26 of the groove 18. This space is shown in exaggerated size in Fig. 4. The tendency for flow of fluid is represented by the arrows 27. In passing between the outside of one of the rings 19 and the groove side surface 26, the fluid presses against one edge of the resilient band 22 causing it to swell and to force the inner edges of the rings 19 outward, thus causing the outer edges to press more tightly against the inner wall 20 of the cylinder 11 and insuring a tight seal. Since each of the rings 19 is in edgewise engagement with the inner wall of the cylinder 11 and the soft band 22 is in engagement with the inner surface 21 of the groove 18 and the inner edges of the rings 19, the space through which fluid might tend to leak is completely sealed. Furthermore, the greater the pressure tending to produce leakage of fluid, the greater the force with which the sealing members are pressed into engagement with the surfaces to be sealed so as to minimize the tendency for leakage.

While we have described our invention as embodied in concrete form and as operating in a specific manner in accordance with the provisions of the patent statutes, it should be understood that we do not limit our invention thereto, since various modifications thereof will suggest themselves to those skilled in the art without departing from the spirit of our invention, the scope of which is set forth in the annexed claims.

What is claimed is:

1. A pair of members relatively movable axially having an annular clearance space between confronting surfaces thereof, one of said members having an annular groove therein, and a seal for closing said clearance space, said seal comprising a ring pack of split rings substantially filling said groove axially, and a resilient band filling the base of said groove and engaging the inner peripheries of all of the rings for pressing the ring pack partially out of said groove against the opposite surface of the ungrooved member, said ring pack having an axial dimension less than the axial dimension of the groove with the rings in engagement with one another whereby fluid may enter between one side wall of the groove and the pack and apply pressure to said resilient band to force said entire ring pack against said opposite surface.

2. A cylinder, a piston therein having an annular groove, a ring pack substantially filling said groove axially, and a resilient band filling the base of said groove for urging said ring pack against said cylinder and sealing said pack in said groove, said ring pack having an axial dimension less than the width of the groove with the rings in engagement with one another whereby fluid entering between the end of the groove and the pack applies pressure to said resilient band to force said entire ring pack against said opposite surface.

3. In combination, a cylinder head having an opening therein, a piston rod slidable in said opening, said cylinder head having an annular groove around said opening, a ring pack substantially filling said groove axially and a relatively soft resilient band filling the base of said groove for urging said ring pack against said piston rod, said ring pack having an axial dimension with the rings in engagement with one another that is less than the axial dimension of the groove whereby fluid entering between the end of the groove and the pack applies pressure to said resilient band to force said entire ring pack against said opposite surface.

4. A seal for an annular clearance space between the inner surface of one member and the outer surface of another member, one of said members having an annular groove therein, an annular resilient gasket positioned in the bottom of said groove engaging the side walls thereof, a plurality of split rings of relatively hard resilient material in said groove lightly urged into contact with the surface of the other member by said resilient gasket, the axial dimension of said ring pack with the rings in engagement with one another being substantially less than the width of said annular groove whereby said rings are urged to the side of the groove under the influence of pressure exposing the resilient gasket to pressure thereby increasing the force urging all of said rings against said mating surface.

5. A seal for an annular clearance space between the inner surface of one member and the outer surface of another member, one of said members having an annular groove therein, said seal comprising a ring pack of flat split washers substantially filling said groove and urged into contact with the surface of the other member by an annular resilient band in the base of said groove, said ring pack having an axial dimension with the rings in engagement with one another such that it is axially movable with respect to the side walls of said groove.

GEORGE H. HUFFERD.
JOSEPH NORMAN PAQUIN.

REFERENCES CITED

The following references are of record in the file of this patent:

UNITED STATES PATENTS

| Number | Name | Date |
|---|---|---|
| 454,093 | Udstad | June 16, 1891 |
| 770,926 | Rhodes | Sept. 27, 1904 |
| 788,769 | Harson | May 2, 1905 |
| 2,303,798 | Solenberger | Dec. 1, 1942 |
| 2,349,170 | Jackman | May 16, 1944 |

FOREIGN PATENTS

| Number | Country | Date |
|---|---|---|
| 2,216 | Great Britain | 1907 |
| 19,660 | Great Britain | 1911 |
| 800,828 | France | July 20, 1936 |